United States Patent
Yamaguchi et al.

(10) Patent No.: US 9,180,440 B2
(45) Date of Patent: Nov. 10, 2015

(54) CATALYST

(75) Inventors: Michitaka Yamaguchi, Ageo (JP);
Akiko Sugioka, Ageo (JP); Takahito Asanuma, Shimonoseki (JP); Yunosuke Nakahara, Ageo (JP); Takahiro Sato, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 14/342,108

(22) PCT Filed: Apr. 24, 2012

(86) PCT No.: PCT/JP2012/060933
§ 371 (c)(1),
(2), (4) Date: Feb. 28, 2014

(87) PCT Pub. No.: WO2013/031288
PCT Pub. Date: Mar. 7, 2013

(65) Prior Publication Data
US 2014/0213439 A1    Jul. 31, 2014

(30) Foreign Application Priority Data

Sep. 2, 2011  (JP) .................................. 2011-192010

(51) Int. Cl.
*B01J 8/02* (2006.01)
*B01J 27/14* (2006.01)
*B01J 27/18* (2006.01)
(Continued)

(52) U.S. Cl.
CPC ........... *B01J 27/1804* (2013.01); *B01D 53/945* (2013.01); *B01J 27/18* (2013.01); *B01J 27/1856* (2013.01); *B01J 35/002* (2013.01); *B01D 2255/1025* (2013.01); *B01D 2255/2061* (2013.01); *Y02T 10/22* (2013.01)

(58) Field of Classification Search
CPC .............. B01J 8/02; B01J 27/14; B01J 27/18; B01D 53/56; B01D 53/94; B01D 53/9413; C01B 31/20
USPC ............ 502/213, 302, 332; 423/213.5, 239.1, 423/437.2
See application file for complete search history.

(56) References Cited

U.S. PATENT DOCUMENTS 5,880,057 A    3/1999  Hatano
8,968,967 B2 *  3/2015  Merzougui et al. ........... 429/523
(Continued)

FOREIGN PATENT DOCUMENTS

JP    06-055075    3/1994
JP    08-150339    6/1996
(Continued)

OTHER PUBLICATIONS

Wladyslawa Szuszkiewicz et al., "Phase Equilibrium in the System Y2O3—P2O5", Polish Journal of Chemistry, 1989, p. 381-391, vol. 63.
(Continued)

*Primary Examiner* — Patricia L Hailey
(74) *Attorney, Agent, or Firm* — The Webb Law Firm

(57) ABSTRACT

A catalyst for exhaust gas purification having superior exhaust gas purification performance is provided. Disclosed is a catalyst containing, as a catalyst support, a composite phosphate containing yttrium and phosphorus and having a composition ratio of yttrium to phosphorus (Y/P) of greater than 1 as a molar ratio.

5 Claims, 2 Drawing Sheets

(51) Int. Cl.
*B01D 53/56* (2006.01)
*B01D 53/94* (2006.01)
*C01B 31/20* (2006.01)
*B01J 27/185* (2006.01)
*B01J 35/00* (2006.01)

(56) References Cited

U.S. PATENT DOCUMENTS

2013/0018161 A1* 1/2013 Ezawa et al. ............... 526/317.1
2014/0221198 A1* 8/2014 Nagao et al. ................. 502/213

FOREIGN PATENT DOCUMENTS

| | | | | |
|---|---|---|---|---|
| JP | 09-155196 | * | 6/1997 | ............ B01J 27/185 |
| JP | 11-197507 | | 7/1999 | |
| JP | 4505046 | | 4/2010 | |
| WO | 2009/142180 | | 11/2009 | |

OTHER PUBLICATIONS

Dinesh Agrawal et al., "The Systems Y2O3—P2O5 and Gd2O3—P2O5", J. Electrochem Soc., 1980, p. 1550-1554, vol. 127(7).

* cited by examiner

CATALYST

CROSS-REFERENCE TO RELATED APPLICATIONS

This application is the United States national phase of International Application No. PCT/JP2012/060933 filed Apr. 24, 2012, and claims priority to Japanese Patent Application No. 2011-192010 filed Sep. 2, 2011, the disclosures of which are hereby incorporated in their entirety by reference.

TECHNICAL FIELD

The present invention relates to a catalyst used for purifying exhaust gas, and more particularly, to a catalyst for exhaust gas purification having high exhaust gas purification performance, for example, a catalyst that purifies harmful components contained in an exhaust gas discharged from an internal combustion engine of an automobile or the like.

BACKGROUND ART

Exhaust gas discharged from an internal combustion engine of an automobile or the like contains harmful components such as hydrocarbons (HC), carbon monoxide (CO) and nitrogen oxides (NOx), and therefore, it is necessary to purify these components. That is, hydrocarbons (HC) and carbon monoxide (CO) are purified by oxidizing the gases using catalysts, and nitrogen oxides (NOx) needs to be purified through reduction using catalysts.

Three-way catalysts have been traditionally used as catalysts for exhaust gas purification of this kind.

Regarding such three-way catalysts, there are catalysts obtained by arbitrarily combining a noble metal such as Pt, Pd or Rh with alumina, ceria, zirconia or a composite oxide thereof, and applying the combination on a honeycomb carrier formed of a ceramic or a metal. For example, catalysts for exhaust gas purification containing composite oxides having an apatite structure have been proposed (see, for example, Patent Documents 1 and 2).

Furthermore, there have also been proposed catalysts for exhaust gas purification, formed from an $AlPO_4$ compound and at least one noble metal component selected from the group consisting of Pt, Pd and Rh supported on the $AlPO_4$ compound (see, for example, Patent Documents 1, 3 and 4).

CITATION LIST

Patent Reference

Patent Document 1: Japanese Patent Application Laid-Open (JP-A) No. 06-055075
Patent Document 2: Japanese Patent Application Laid-Open (JP-A) No. 11-197507
Patent Document 3: Japanese Patent Application Laid-Open (JP-A) No. 08-150339
Patent Document 4: Japanese Patent No. 4505046

Conventional catalysts for exhaust gas purification have a problem that generally, heat resistance and exhaust gas purification performance of the catalysts are not necessarily sufficient.

Furthermore, the $AlPO_4$ compounds that have been conventionally used have a berlinite crystal structure, and have a small BET specific surface area and inferior heat resistance. Therefore, the purification performance of a catalyst for exhaust gas purification that uses such an $AlPO_4$ compound has not been necessarily satisfactory.

Thus, it is an object of the present invention to provide a catalyst for exhaust gas purification having superior exhaust gas purification performance.

SUMMARY OF THE INVENTION

The present invention proposes a catalyst which is a composite phosphate containing yttrium and phosphorus, and contains, as a catalyst support, a composite phosphate having a composition ratio of yttrium to phosphorus (Y/P) of greater than 1 as a molar ratio.

It was found that a catalyst which uses, as a catalyst support, a composite phosphate having a composition ratio of yttrium to phosphorus (Y/P) of greater than 1 as a molar ratio can have a further increased catalytic activity, particularly a further increased catalytic activity of converting carbon monoxide to carbon dioxide, as compared with a catalyst which uses $YPO_4$ or the like as a catalyst support. Therefore, the catalyst proposed by the present invention can be effectively utilized as a catalyst for exhaust gas purification having high exhaust gas purification performance.

DESCRIPTION OF THE INVENTION

Figure 1:
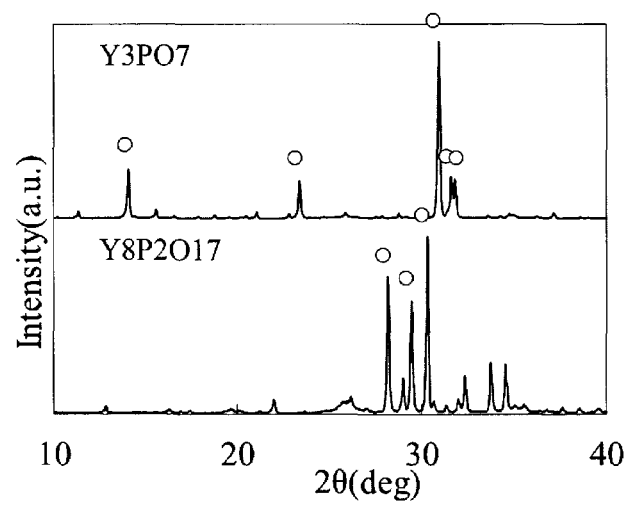
FIG. 1 is a diagram showing the X-ray diffraction patterns of $Y_3PO_7$ obtained in Example 2, and $Y_8P_2O_{17}$ obtained in Example 4.

Next, an exemplary embodiment of the present invention will be described, but the present invention is not intended to be limited to the exemplary embodiment to be described below.

(Present Catalyst)

The catalyst according to the present exemplary embodiment (referred to as "present catalyst") is a catalyst having a constitution in which a noble metal is supported on a catalyst support formed from a composite phosphate.

(Catalyst Support)

The catalyst support of the present catalyst (referred to as "present catalyst support") is formed from a composite phosphate containing yttrium and phosphorus, and it is important that the present catalyst support be formed from a composite phosphate having a composition ratio of yttrium to phosphorus of greater than 1 as a molar ratio.

A composite phosphate containing yttrium (Y) and phosphorus (P) was used as a catalyst support, and a thermal desorption gas analysis ($CO_2$-TPD (Temperature Programmed Desorption)) of the support was carried out. As a result, it was found that as the composition ratio of yttrium (Y) to phosphorus (P) (Y/P) is increased, the amount of desorption of $CO_2$ increases, basicity (electron donating properties) increases, and the catalytic activity can be increased.

From such a viewpoint, it is important for the present catalyst support to contain a composite phosphate having a composition ratio of yttrium to phosphorus of greater than 1 as a molar ratio, in other words, a composite phosphate having a higher composition ratio of yttrium to phosphorus as compared with $YPO_4$.

If the composition ratio of yttrium to phosphorus is higher compared with the composition ratio of $YPO_4$, the composite phosphate has heat resistance that is higher than or equal to that of $YPO_4$, and the catalytic activity of the noble metal can be further increased as compared with $YPO_4$.

Among others, the present catalyst support is preferably a composite phosphate containing $Y_3PO_7$ or $Y_8P_2O_{17}$. At this time, the catalyst support may be composed of a single phase of the relevant composite phosphate, or may be composed of a mixed phase with another compound, for example, $Y_2O_3$. The catalyst characteristics are not much affected as long as these compounds constitute the main components of the support.

In regard to the crystal composition of $Y_3PO_7$ or $Y_8P_2O_{17}$, a $Y_2O_3$—$P_2O_5$ phase diagram has been reported (for example, W. Szuszkiewicz, T. Znamierowska, Polish J. Chemistry, 63, p. 381 (1989)). However, since there are many crystal compositions that are generally not known, additional explanation will be given here.

The existence of the $Y_3PO_7$ phase or the $Y_8PO_{17}$ phase has been known in academic articles, but it is not easy to obtain single phases of these components at room temperature.

The X-ray diffraction patterns of the $Y_3PO_7$ phase and the $Y_8PO_{17}$ phase obtained in the present invention are such that when Cu—Kα radiation of copper is used, $Y_3PO_7$ exhibits strong diffraction at 14.1°, 23.4°, 30.9° (strongest peak), 31.6° and 31.8°, and $Y_8PO_{17}$ exhibits strong diffraction at 28.2°, 29.4°, and 30.3° (strongest peak).

There is available $La_3PO_7$ as an analogous crystal structure, and if the X-ray diffraction pattern is similar to that of this compound, the phase can be identified to be $Y_3PO_7$.

On the other hand, a phosphate obtained by co-precipitation at Y/P=4 in an aqueous ammonia solution has a diffraction pattern that coincides with the diffraction pattern of a Y-rich phosphate (Y/P) obtained by a solid phase method according to a production method published in an article (for example, D. Agrawal and F. A. Hummel, J. Electrochem. Soc., Vol. 127(7), p. 1550 (1980)). Therefore, the phosphate can be identified to be $Y_8P_2O_{17}$.

The method for producing the present catalyst support is not particularly limited. For example, in order to obtain a uniform composition, the present catalyst support can be produced by neutralizing a mixed aqueous solution of yttrium and phosphoric acid at an intended composition, and coprecipitating and depositing the catalyst support by co-precipitation.

At this time, regarding the yttrium raw material, for example, yttrium nitrate or the like can be used. Furthermore, regarding the phosphorus raw material, for example, phosphoric acid or the like can be used.

Meanwhile, it is not easy to obtain a single phase of $Y_3PO_7$ or a single phase of $Y_8P_2O_{17}$, and even if precipitation is induced at a stoichiometric composition, a composite composition in which $Y_2O_3$ and $YPO_4$ are present in mixture may be obtained. However, if the $Y_3PO_7$ phase or the $Y_8PO_{17}$ phase is present as a main component, even if these phases are present in mixture, the catalyst characteristics are not much affected.

When it is intended to obtain a single phase by increasing purity, the single phase can be obtained by inducing co-precipitation by adjusting the Y/P ratio to be higher than the intended composition, depositing a mixture of the intended composite phosphate and $Y_2O_3$, and then dissolving $Y_2O_3$ using an acid.

(Noble Metal)

The noble metal that is supported on the present catalyst support may be one kind or two or more kinds selected from the group consisting of, for example, platinum, palladium, rhodium, gold, silver, ruthenium, iridium, nickel, cerium, cobalt, copper and strontium. Among them, the noble metal is preferably one kind or two or more kinds selected from the group consisting of platinum, palladium and rhodium, and among them, rhodium is most preferred as the noble metal for the present catalyst, that is, as a noble metal that can enhance activity.

The support concentration of the noble metal is such that as the concentration is increased, the purification performance is enhanced; however, since the catalyst becomes expensive proportionally, it is preferable to select the performance and the price to be well-balanced.

A tentative reference of the support concentration of the noble metal is preferably 0.1% to 1.0% by mass, and among others, more preferably 0.1% to 0.5% by mass.

(Method for Producing Present Catalyst)

Regarding the method for supporting a noble metal on the present catalyst support, the noble metal may be mixed into this precipitate, or may be applied or fixed on a catalyst body, subsequently impregnated in a noble metal salt liquid, and then deposited.

If necessary, ceria, zirconia or the like may also be mixed as a co-catalyst into the noble metal.

(Production of Catalyst for Exhaust Gas Purification)

When the present catalyst is used as a catalyst for exhaust gas purification, for example, as a catalyst for purifying harmful components contained in an exhaust gas that is discharged from an internal combustion engine of an automobile, a motorcycle or the like, it is conventional to use the present catalyst in the form of being fixed onto a base material formed from a ceramic or a metal.

For example, a catalyst for exhaust gas purification can be produced by applying a slurry containing the present catalyst support, a noble metal and a binder on the wall surfaces of a base material formed from ceramic honeycomb, drying the slurry, and calcining the slurry.

At this time, the content of the catalyst material (composite phosphate) contained in the coating agent may be adjusted to 30% to 80% by mass, and among others, it is more preferable to adjust the content to 50% to 70% by mass.

However, as long as a support that can be effectively brought into contact with the treatment gas is used, the production method is not intended to be limited to such a fixing method.

Regarding the shape of the base material, shapes such as honeycomb, sheet and pellet are generally used.

Furthermore, examples of the material of the base material include ceramics such as alumina ($Al_2O_3$), mullite ($3Al_2O_3$-$2SiO_2$) and cordierite ($2MgO$-$2Al_2O_3$-$5SiO_2$); and metal materials such as stainless steel.

(Description of Phrases)

When the expression "X to Y" (X and Y are arbitrary numbers) is used in the present specification, unless particularly stated otherwise, the expression includes the meaning of "more than or equal to X and less than or equal to Y", as well as the meaning of "preferably more than X" or "preferably less than Y".

Furthermore, when the expression "more than or equal to X" (X is an arbitrary number) or "less than Y" (Y is an arbitrary number) is used, the expression also includes the intention to the effect that "it is preferably more than X" or "it is preferably less than Y".

EXAMPLES

Hereinafter, the present invention will be described in more detail by way of Examples and Comparative Examples to be described below.

Example 1

A raw material solution was prepared using an aqueous solution of yttrium nitrate and 85% phosphoric acid as raw materials, by mixing the raw materials at a Y/P ratio (molar ratio) of 3. 2.5 mol/L ammonium hydrogen carbonate was slowly added dropwise to this raw material solution to adjust the pH value to 5 to 7, and co-precipitation was carried out. A gel-like product thus obtained was filtered, and a precursor thus obtained was dried overnight at 120° C. Thereafter, the dried precursor was pulverized using a mortar, and the resultant was pre-calcined for 5 hours at 600° C. in air, and then further subjected to main calcination for 20 hours at 1200° C. Thus, a composite phosphate was obtained. As a result of performing X-ray diffraction, it was confirmed that this composite phosphate had a composition in which slight amounts of $Y_2O_3$ and $YPO_4$ were included to the structure of $Y_3PO_7$.

Example 2

Co-precipitation, filtration, drying, pulverization, pre-calcination and main calcination were carried out by the same procedure as in Example 1, except that an aqueous solution of yttrium nitrate and 85% phosphoric acid were mixed at a Y/P ratio (molar ratio) of 5, and thus a composite phosphate formed from a mixed phase of $Y_3PO_7$ and $Y_2O_3$ was obtained.

The composite phosphate composed of this mixed phase was immersed in dilute nitric acid to adjust the composite phosphate to pH 3, and then it was left to stand overnight. Thus, a single phase of $Y_3PO_7$ was obtained. Furthermore, this was heat treated for 5 hours at 800° C., and thereby remaining nitric acid groups were burned off. From the result of X-ray diffraction (see the upper part of FIG. 1), it was confirmed that this composite phosphate had a single phase composition of $Y_3PO_7$.

Example 3

A raw material solution was prepared using an aqueous solution of yttrium nitrate and 85% phosphoric acid as raw materials, by mixing the raw materials at a Y/P ratio (molar ratio) of 4.

A 4 mol/L aqueous ammonia solution was slowly added dropwise to this raw material solution to adjust the pH value to 9 to 10, and co-precipitation was carried out. A gel-like product thus obtained was filtered, and a precursor thus obtained was dried overnight at 120° C. Thereafter, the dried precursor was pulverized using a mortar, and the resultant was pre-calcined for 5 hours at 600° C. in air, and then further subjected to main calcination for 20 hours at 1300° C. Thus, a composite phosphate was obtained. As a result of performing X-ray diffraction, it was confirmed that this composite phosphate had a composition in which slight amounts of $Y_2O_3$ and $YPO_4$ were included to the structure of $Y_8P_2O_{17}$.

Example 4

Co-precipitation, filtration, drying, pulverization, pre-calcination and main calcination were carried out by the same procedure as in Example 3, except that an aqueous solution of yttrium nitrate and 85% phosphoric acid were mixed at a Y/P ratio (molar ratio) of 5, and thus a composite phosphate formed from a mixed phase of $Y_8PO_{17}$ and $Y_2O_3$ was obtained.

The composite phosphate composed of this mixed phase was immersed in dilute nitric acid to adjust the composite phosphate to pH 3, and then it was left to stand overnight. Thus, a single phase of $Y_8PO_{17}$ was obtained. Furthermore, this was heat treated for 5 hours at 800° C., and thereby remaining nitric acid groups were burned off. From the result of X-ray diffraction (see the lower part of FIG. 1), it was confirmed that this composite phosphate had a single phase composition of $Y_8P_2O_{17}$.

Comparative Example 1

A raw material solution was prepared using an aqueous solution of yttrium nitrate and 85% phosphoric acid as raw materials, by mixing the raw materials at a Y/P ratio (molar ratio) of 1. A 4 mol/L aqueous ammonia solution was slowly added dropwise to this raw material solution to adjust the pH value to 8, and co-precipitation was carried out. A gel-like product thus obtained was filtered, and a precursor thus obtained was dried overnight at 120° C. Thereafter, the dried precursor was pulverized using a mortar, and the resultant was pre-calcined for 5 hours at 600° C. in air, and then further subjected to main calcination for 20 hours at 1300° C. Thus, a composite phosphate was obtained. As a result of performing X-ray diffraction (see FIG. 1), it was confirmed that this composite phosphate had the structure of $YPO_4$.

<Production of Catalyst and Evaluation of Activity>

Catalyst bodies for evaluation were produced using the composite phosphates obtained in Examples 1 to 4 or Comparative Example 1, and the exhaust gas purification performance was evaluated.

(Production of Catalyst Bodies for Evaluation 1: Pre-Addition of Rhodium)

The composite phosphate obtained in Example 1, 2, 3 or 4, or Comparative Example 1 was used as a support, and Rh was supported thereon by an evaporation drying method such that the Rh concentration would be 0.4 wt % based on the composite phosphate. Subsequently, the composite phosphate was subjected to a heat treatment at 450° C. for one hour, and thus a catalyst body for evaluation was obtained.

Catalyst bodies for evaluation produced in this manner will be referred to as Example catalyst bodies 1, 2, 3 and 4, and Comparative Example catalyst body 1, respectively.

Furthermore, 60% by mass of each of the composite phosphates having Rh supported thereon in the manner described above, 30% by mass of stabilized alumina, and 10% by mass of an alumina-based binder were mixed, and a powder mixture thus obtained was subjected to a wet pulverization treatment to obtain slurry. This slurry was applied on a ceramic honeycomb base material in an amount of 100 g/L (Rh concentration: 0.15 g/L), and the slurry was dried to obtain a honeycomb catalyst body for evaluation.

Honeycomb catalyst bodies for evaluation produced in this manner will be referred to Example catalyst bodies 1-1, 2-1, 3-1 and 4-1, and Comparative Example catalyst body 1-1, respectively.

(Production of Catalyst Bodies for Evaluation 2: Post-Addition of Rhodium)

60% by mass of the composite phosphate obtained in Example 1 or Example 3, 30% by mass of stabilized alumina, and 10% by mass of an alumina-based binder were mixed, and a powder mixture thus obtained was subjected to a wet pulverization treatment to obtain slurry. This slurry was applied on a ceramic honeycomb base material in an amount of 100 g/L (Rh concentration: 0.15 g/L), and the slurry was dried. Subsequently, this was immersed in an aqueous solution of rhodium nitrate to adsorb rhodium, and thus a honeycomb catalyst body for evaluation was obtained.

Honeycomb catalyst bodies for evaluation produced in this manner will be referred to as Example catalyst bodies 1-2 and 3-2, respectively.

(Evaluation of Exhaust Gas Purification Performance)

The purification performance for simulated exhaust gas was analyzed using a continuous flow reaction apparatus.

A simulated exhaust gas under the conditions of 10° C./min, λ=0.98, air-fuel ratio (A/F)=14.6, CO: 5000 ppm, $H_2$: 0.17%, $C_3H_6$: 1200 ppm C, NO: 500 ppm, $O_2$: 0.48%, $CO_2$: 14%, $H_2O$: 10%, $N_2$: balance, SV=100,000 $h^{-1}$, was introduced to the catalyst honeycombs. Meanwhile, the "A/F" of the air-fuel ratio (A/F) is the abbreviation of Air/Fuel, and this is a value indicating the ratio of air and fuel.

The exit gas components were analyzed using a CO/HC/NO analyzer (Exhaust Gas Analyzer "SESAM3-N, BEX-5200C" manufactured by Best Sokki, Ltd.).

The aforementioned simulated gas was introduced to the honeycomb catalyst bodies for evaluation that had been heated to a certain temperature, and the purification ratio was calculated from the ratio of the exhaust gas to the feed gas. Then, the temperature dependency of the purification ratios of various gases for various temperatures (also referred to as "L/O (Light Off) performance") was measured and presented in a diagram (see FIG. 2). From this diagram, the temperatures corresponding to the 50% purification ratio of various gases (this temperature will be referred to as "T-50") were determined and indicated in Table 1.

A lower temperature of T-50 implies that the purifying action is exhibited at a lower temperature. Therefore, this serves as an index for the performance.

TABLE 1

| Catalyst body | Catalyst material composition | NO | HC | CO |
|---|---|---|---|---|
| Comparative Example 1-1 | YPO4 | 253 | 286 | 252 |
| Example 1-1 | Y3PO7 | 257 | 295 | 251 |
| Example 1-2 | | 253 | 293 | 250 |
| Example 2-1 | | 254 | 285 | 250 |
| Example 3-1 | Y8P2O17 | 250 | 280 | 239 |

TABLE 1-continued

| Catalyst body | Catalyst material composition | NO | HC | CO |
|---|---|---|---|---|
| Example 3-2 | | 249 | 281 | 239 |
| Example 4-1 | | 250 | 280 | 238 |

In regard to a catalyst action of converting carbon monoxide to carbon dioxide, it was confirmed that a catalyst using $Y_3PO_7$ and $Y_8PO_{17}$ as the support (catalyst material) has a lower temperature of T-50 and exhibits a purifying action at a lower temperature, as compared with a catalyst formed using $YPO_4$ as the support (catalyst material).

Figure 2:
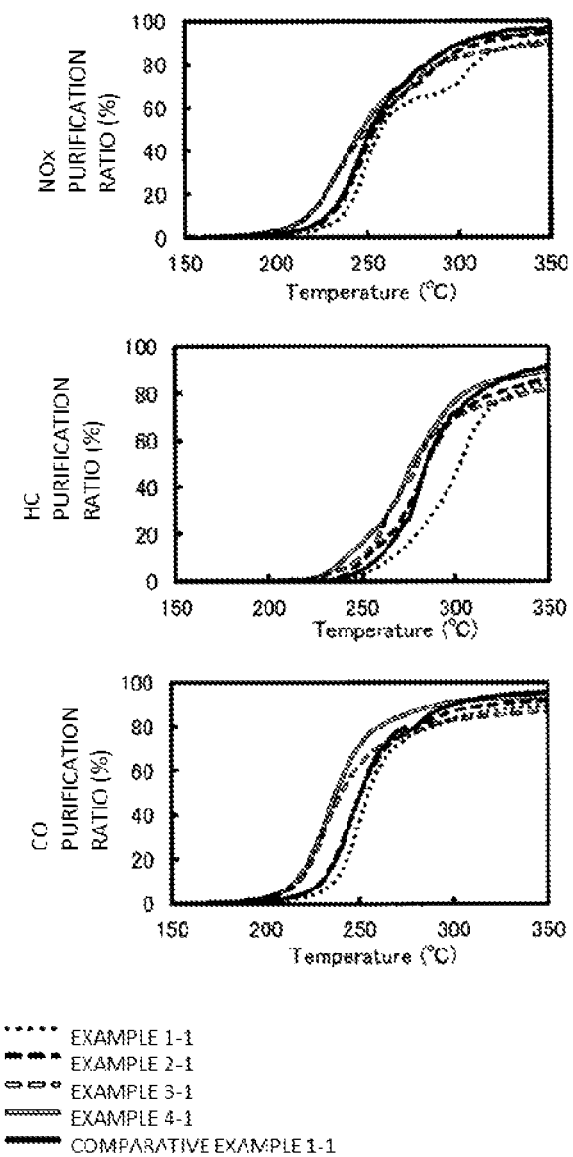
FIG. 2 is a group of graphs showing the temperature dependency of the purification ratio ("L/O performance") of various samples obtained in Examples and Comparative Examples, at an air-fuel ratio (A/F)=14.6, the graphs respectively illustrating, sequentially from the top, the relationship between temperature and the NOx purification ratio, the relationship between temperature and the HC purification ratio, and the relationship between temperature and the CO purification ratio.

Furthermore, from FIG. 2 that presents the results of the gas purification evaluation carried out as described above, it was found that a catalyst using $Y_3PO_7$ and $Y_8PO_{17}$ as the support (catalyst material) has a lower temperature of T-50 than the conventional $YPO_4$ for a number of gases, and $Y_8PO_{17}$ in particular exhibits a performance superior or equivalent to that of YPO for all kinds of gases. Particularly with regard to CO, it was confirmed that the catalyst improved the T-50 temperature by 10° C. Thus, it was confirmed that this catalyst is an especially excellent catalyst.

Thus, it was found that when a composite phosphate having a composition ratio of yttrium to phosphorus (Y/P) of greater than 1 as a molar ratio is used as a catalyst support, the catalyst activity can be further enhanced as compared with the case of using, for example, $YPO_4$ or the like as the catalyst support.

The invention claimed is:

1. A catalyst comprising, as a catalyst support, a composite phosphate containing yttrium and phosphorus and having a composition ratio of yttrium to phosphorus of greater than 1 as a molar ratio, wherein said composite phosphate comprises at least $Y_3PO_7$ or $Y_8P_2O_{17}$.

2. A catalyst comprising a noble metal supported on a catalyst support formed from the composite phosphate of claim 1.

3. The catalyst according to claim 2, wherein the noble metal is rhodium.

4. The catalyst according to claim 1, having an action of converting carbon monoxide to carbon dioxide.

5. The catalyst according to claim 1, wherein the catalyst is used for purification of automobile exhaust gas.

* * * * *